§

US007666808B2

(12) United States Patent
Obayashi et al.

(10) Patent No.: US 7,666,808 B2
(45) Date of Patent: Feb. 23, 2010

(54) DENITRIFICATION CATALYST REGENERATION METHOD

(75) Inventors: Yoshiaki Obayashi, Hiroshima (JP); Toshio Koyanagi, Nagasaki (JP); Masanori Demoto, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/081,548

(22) Filed: Apr. 17, 2008

(65) Prior Publication Data

US 2008/0220966 A1 Sep. 11, 2008

Related U.S. Application Data

(62) Division of application No. 10/994,408, filed on Nov. 23, 2004, now Pat. No. 7,501,106.

(30) Foreign Application Priority Data

Dec. 25, 2003 (JP) ............................. 2003-429392

(51) Int. Cl.
*B01J 38/60* (2006.01)
(52) U.S. Cl. ..................................................... 502/27
(58) Field of Classification Search ................... 502/27, 502/22, 24
See application file for complete search history.

(56) References Cited

U.S. PATENT DOCUMENTS

| 4,142,989 | A | | 3/1979 | Kohama et al. | |
|---|---|---|---|---|---|
| 4,595,666 | A | * | 6/1986 | Ganguli | 502/26 |
| 2001/0012817 | A1 | * | 8/2001 | Nojima et al. | 502/26 |
| 2004/0261720 | A1 | | 12/2004 | Tolmachev et al. | |
| 2006/0148639 | A1 | * | 7/2006 | Foerster | 502/27 |

FOREIGN PATENT DOCUMENTS

| CN | 1574199 | A | | 2/2005 |
|---|---|---|---|---|
| JP | 51-25492 | | | 3/1976 |
| JP | 58-189041 | | | 11/1983 |
| JP | 7-222924 | A | | 8/1995 |
| JP | 10-156192 | A | | 6/1998 |
| JP | 10-156192 | A | * | 6/1998 |
| JP | 10-337483 | A | | 12/1998 |
| JP | 2000-37635 | | | 2/2000 |
| JP | 2002-316051 | | | 10/2002 |
| WO | WO/2004/022226 | | * | 3/2004 |

* cited by examiner

*Primary Examiner*—Wayne Langel
*Assistant Examiner*—Brittany M Martinez
(74) *Attorney, Agent, or Firm*—Birch, Stewart, Kolasch & Birch, LLP

(57) ABSTRACT

A denitrification catalyst regeneration method comprises heat-treating a used denitrification catalyst, then cleaning the denitrification catalyst with an aqueous solution of oxalic acid, and then finish washing the denitrification catalyst with water to regenerate the denitrification catalyst.

4 Claims, No Drawings

DENITRIFICATION CATALYST REGENERATION METHOD

This application is a Divisional of application Ser. No. 10/994,408, filed Nov. 23, 2004, now U.S. Pat. No. 7,501,106 which claims priority to JP 2003-429932, filed Dec. 25, 2003. The entire disclosures thereof, including specification, claims, drawings and summary, are incorporated herein by reference in their entirety.

BACKGROUND OF THE INVENTION

1. Field of the Invention

This invention relates to a method for regenerating a denitrification catalyst for removing nitrogen oxides from a combustion exhaust gas from a boiler or the like.

2. Description of the Related Art

A method, put to practical use, for removing nitrogen oxides ($NO_x$) contained in a combustion exhaust gas from a boiler or the like is an ammonia catalytic reduction process which decomposes $NO_x$ into nitrogen and water, both harmless substances, by use of ammonia ($NH_3$) as a reducing agent in the presence of a nitrogen oxide removal catalyst (herein after referred to as "denitrification catalyst").

In the treatment of an exhaust gas from a boiler using fuel oil C with a high sulfur content or the like as a fuel, a high concentration of sulfur dioxide ($SO_2$) is present in a treated gas. Thus, the oxidation of $SO_2$ into sulfur trioxide ($SO_3$), which occurs simultaneously with the $NO_x$ reduction and removal reaction, generates a high concentration of $SO_3$. The high concentration $SO_3$ easily binds to the unreacted portion of $NH_3$, which has been used as the reducing agent, in a low temperature region, thereby forming acidic ammonium sulfate and other compounds. These by-products cause clogging or partial obstruction to the interior and piping of various devices such as a downstream heat exchanger, etc., thereby increasing a pressure loss. Thus, it is necessary to take measures, such as upgrading of a dust collector.

As a catalyst showing excellent denitrification performance and low property of oxidizing $SO_2$ (herein after referred to as low $SO_2$-oxidizing property), a denitrification catalyst is available which has a tungsten oxide or a vanadium-tungsten oxide carried on titania.

However, dust, which contains heavy metals, such as vanadium, nickel and iron, and an alkali salt such as Glauber's salt, is present, in addition to $SO_2$, in a combustion exhaust gas of a heavy oil with a high sulfur content. If the above denitrification catalyst is exposed to this exhaust gas for a long period of time, dust components are deposited and accumulated on the honeycomb-shaped wall surface of the denitrification catalyst, thereby inducing a decline in the denitrification performance and the enhancement of the $SO_2$ oxidizing property. Thus, there is need to perform treatment for restoring the denitrification performance and the low $SO_2$-oxidizing property of the denitrification catalyst.

The decline in the denitrification performance is mainly attributable to the fact that alkali components, such as Na and K, which are contained in the dust in the exhaust gas, are accumulated in the denitrification catalyst. The enhancement of the $SO_2$ oxidizing property is mainly ascribable to the accumulation, in the denitrification catalyst, of vanadium which is contained in the dust in the exhaust gas.

Hence, the inventors proposed methods which comprise washing a used vanadium-tungsten-titanium based denitrification catalyst with water or an aqueous solution of a dilute inorganic acid, then cleaning the washed catalyst with a 0.1 to 5 wt. % aqueous solution of oxalic acid, and then further washing the cleaned catalyst with water to remove oxalic acid remaining on the catalyst, thereby removing the vanadium compound, the cause of the enhancement of the $SO_2$ oxidizing property, so that the catalyst is regenerated (see Japanese Patent Application Laid-Open No. 1995-222924 (herein after referred to as Patent Document 1), No. 1998-156192, and No. 1998-337483).

Ultraheavy oils, such as ORIMULSION (a trade name of Mitsubishi Corporation for an oil-in-water type emulsion produced by mixing Orinoco tar, which is an ultraheavy oil collected in Orinoco State, Venezuela, with water and a surfactant for easy handling at the ordinary temperature), asphalt, and vacuum residual oil (VOR), contain 2 to 3 times as much sulfur, and 5 to 7 times as much vanadium as in fuel oil C, as shown in Table 1. Moreover, the $SO_2$ concentration in the combustion exhaust gas of such ultraheavy oils is very high. When such ultraheavy oils are used as fuels for a boiler, therefore, a compound containing an alkali component, such as magnesium, is added to lessen corrosion in the boiler.

Hence, an exhaust gas from a boiler using an ultraheavy oil, such as ORIMULSION, asphalt, or VOR (hereinafter referred to as "ORIMULSION-fired boiler"), as a fuel is by far higher in $SO_2$ concentration and dust concentration than an exhaust gas from a boiler using fuel oil C as a fuel (hereinafter referred to as "fuel oil C-fired boiler").

TABLE 1

| Measured item | ORIMULSION | Orinoco oil | Fuel oil C |
|---|---|---|---|
| Specific gravity (80° C./4° C.) | — | 0.976 | 0.889 |
| Viscosity (cSt) (80° C.) | — | 1528 | 34.8 |
| N (wt. %) | 0.48 | 0.63 | 0.22 |
| S (wt. %) | 2.78 | 3.79 | 0.97 |
| Moisture (wt. %) | 28-30 | <0.1 | 0.1 |
| Higher heating value | | | |
| (kJ/kg) | ca. 29400 | ca. 42000 | 43680 |
| [kcal/kg] | [ca. 7000] | [ca. 10000] | [10400] |
| Ash (wt. %) | 0.08 | 0.13 | 0.01 |
| Residual carbon (wt. %) | 11.89 | 17.4 | 8.0 |
| V (ppm) | 280-350 | 400-500 | ≦50 |
| Na (ppm) | 40-70 | 60-100 | — |

(Source: The journal "The Thermal and Nuclear Power", No. 465, June 1995)

Thus, the ORIMULSION-fired boiler is much higher than the fuel oil C-fired boiler in the rate of deposition of dust on the surface of the denitrification catalyst. That is, dust fusion occurs under the action of sulfuric acid and liquid acidic ammonium sulfate which are formed when the temperature of the exhaust gas drops at boiler shutdown or the like. As a result, the amount of increase, per unit time, of the deposition on an upstream end portion of the denitrification catalyst in its exhaust gas flow direction, and on its surface in contact with the gas is so large that gas passage holes tend to be clogged and obstructed early.

In the event of an increase in a pressure loss due to clogging with dust, a decline in denitrification performance and enhancement of $SO_2$ oxidizing property due to deposition and accumulation of dust on the surface and interior of the denitrification catalyst, oxalic acid cleaning as proposed by the aforementioned Patent Document 1 is performed to regenerate the denitrification catalyst.

No problem arises in regenerating the denitrification catalyst of the fuel oil C-fired boiler by the oxalic acid cleaning proposed by the Patent Document 1. However, if it is attempted to regenerate the denitrification catalyst of the ORIMULSION-fired boiler by the oxalic acid cleaning proposed by the Patent Document 1, dust deposited and accumulated in the denitrification catalyst is minimally removable, and the denitrification performance and the low $SO_2$ oxidizing property can be recovered only to a certain degree.

SUMMARY OF THE INVENTION

In view of the above circumstances, the present invention has as an object the provision of a denitrification catalyst regeneration method which can reliably recover the denitrification performance and the low $SO_2$-oxidizing property of even a denitrification catalyst used for denitrification of an exhaust gas after an ultraheavy oil is used for combustion.

According to a first aspect of the present invention, for solving the aforementioned problems, there is provided a denitrification catalyst regeneration method comprising applying heat-treatment to a used denitrification catalyst, then cleaning the denitrification catalyst with an aqueous solution of oxalic acid, and then finish washing the denitrification catalyst with water to regenerate the denitrification catalyst.

In the first aspect of the present invention, the denitrification catalyst regeneration method may further comprise performing the heat-treatment, then roughly washing the denitrification catalyst with water, and then cleaning the denitrification catalyst with an aqueous solution of oxalic acid.

In the first aspect of the present invention, the oxalic acid concentration of the aqueous solution of oxalic acid may be 4 to 25% by weight.

In the first aspect of the present invention, the oxalic acid concentration of the aqueous solution of oxalic acid may be 0.5 to 25% by weight.

In the first aspect of the present invention, the temperature of the heat-treatment may be 450 to 600° C.

According to a second aspect of the present invention, there is provided a denitrification catalyst regeneration method comprising cleaning a used denitrification catalyst with an aqueous solution of sulfuric acid or an aqueous solution of hydrochloric acid, and then finish washing the denitrification catalyst with water to regenerate the denitrification catalyst.

In the second aspect of the present invention, the denitrification catalyst regeneration method may further comprise roughly washing the denitrification catalyst with water, and then performing the cleaning of the denitrification catalyst with the aqueous solution of sulfuric acid or the aqueous solution of hydrochloric acid.

In the second aspect of the present invention, the acid concentration of the aqueous solution of sulfuric acid or the aqueous solution of hydrochloric acid may be 3 to 12N.

In the second aspect of the present invention, the temperature of the aqueous solution of sulfuric acid or the aqueous solution of hydrochloric acid may be 60 to 90° C.

According to the denitrification catalyst regeneration method of the present invention, the denitrification performance and the low $SO_2$ oxidizing property of even a denitrification catalyst used for denitrification of an exhaust gas after use of an ultraheavy oil for combustion can be reliably recovered.

DESCRIPTION OF THE PREFERRED EMBODIMENTS

Embodiments of the denitrification catalyst regeneration method according to the present invention will be described in detail, but the denitrification catalyst regeneration method of the present invention is in no way limited to these embodiments.

As stated earlier, no problem occurs in regenerating the denitrification catalyst of the fuel oil C-fired boiler by the oxalic acid cleaning proposed by the aforementioned Patent Document 1. However, if it is attempted to regenerate the denitrification catalyst of the ORIMULSION-fired boiler by the oxalic acid cleaning proposed by the Patent Document 1, dust deposited and accumulated in the denitrification catalyst is minimally removable, and the denitrification performance and the low $SO_2$-oxidizing property can be recovered only to a certain degree.

The cause for the above disadvantages has been investigated variously to find the following facts newly: The dust deposited and accumulated in the denitrification catalyst of the fuel oil C-fired boiler contains the vanadium component in the form of vanadium pentoxide ($V_2O_5$) which dissolves in an aqueous solution of oxalic acid. On the other hand, the dust deposited and accumulated in the denitrification catalyst of the ORIMULSION-fired boiler contains the vanadium component in the form of vanadium oxysulfate ($VOSO_4$) which minimally dissolves in an aqueous solution of oxalic acid.

Thus, further studies have been conducted on the cause for the dust deposited and accumulated in the denitrification catalyst of the ORIMULSION-fired boiler to take the form of $VOSO_4$. As a result, the following facts have been found newly: The vanadium component flies in the state of $V_2O_5$ to the denitrification catalyst. Upon deposition on the denitrification catalyst, however, the vanadium component reacts with $SO_2$ and $SO_3$ in the exhaust gas according to the following reaction scheme (1) to turn into $VOSO_4$, which is accumulated in the denitrification catalyst:

$$V_2O_5 + SO_2 + SO_3 \rightarrow 2VOSO_4 \quad (1)$$

The denitrification catalyst of the fuel oil C-fired boiler relatively low in the $SO_2$ concentration and the dust concentration in the exhaust gas, therefore, can be sufficiently regenerated by the oxalic acid cleaning proposed in the aforementioned Patent Document 1. The denitrification catalyst of the ORIMULSION-fired boiler markedly high in the $SO_2$ concentration and the dust concentration in the exhaust gas, on the other hand, cannot be sufficiently regenerated by the oxalic acid cleaning proposed in the Patent Document 1.

Concretely, the denitrification catalyst exposed for a long time to the exhaust gas of the ORIMULSION-fired boiler with a high $SO_2$ concentration of 2000 to 3000 ppm was greatly different from the denitrification catalyst exposed to the exhaust gas of the fuel oil C-fired boiler in terms of the dust deposition status as seen from the following points:

(1) The amount of dust deposited on the hole inner walls of the honeycomb-shaped denitrification catalyst was remarkably large. Thus, the increase, over time, in the thickness of the dust deposited in layers was noticeably rapid, and the proportion of clogging of the holes of the denitrification catalyst was high.

(2) When the denitrification catalyst was cut along the direction of flow of the exhaust gas, the wall surface was colored in blue, and most of the vanadium component was present in the state of $VOSO_4$.

(3) A water-soluble sulfate, such as magnesium sulfate, was contained in a large amount.

{Heat-treatment Mode}

According to the present invention, a used denitrification catalyst is heat-treated, then the denitrification catalyst is cleaned with an aqueous solution of oxalic acid, and then the denitrification catalyst is finish washed with water to regenerate the denitrification catalyst.

Concretely, the following steps are effected: (1) The denitrification catalyst, in which $VOSO_4$ is deposited and accumulated, is heat-treated to calcine $VOSO_4$, thereby converting it into the state of $V_2O_5$ which dissolves in an aqueous solution of oxalic acid (heat-treatment step (pretreatment)). (2) Then, the denitrification catalyst is cleaned with an aqueous solution of oxalic acid to dissolve alkali components (Na, K, etc.) which cause a decline in the performance of the denitrification catalyst, and a vanadium component ($V_2O_5$) which causes enhancement of $SO_2$ oxidizing property (oxalic acid cleaning step (essential treatment)). (3) Then, the denitrification catalyst is finish washed with water to remove residues of oxalic acid which cause a decrease in catalyst strength (finish water washing step (post-treatment)). Finally, the denitrification catalyst is dried, whereby the denitrification catalyst can be regenerated efficiently. Details will follow.

The heat-treatment step as the pretreatment step is the step of heat-treating the used denitrification catalyst, in which $VOSO_4$ has been deposited and accumulated to lower the denitrification performance and enhance the $SO_2$ oxidizing property, thereby converting $VOSO_4$ into $V_2O_5$.

The heat-treatment temperature is preferably 450 to 600° C. If the heat-treatment temperature is lower than 450° C., the decomposition pressure for $VOSO_4$ is so low that a long time is taken for calcination. If the temperature is higher than 600° C., the denitrification catalyst undergoes heat deterioration.

The oxalic acid cleaning step as the essential step is the step of dissolving compounds of alkali metals (Na, K, etc.) and alkaline earth metals (Ca, Mg, etc.), and the vanadium component, whose state has been changed into $V_2O_5$ by heat-treatment, by use of an aqueous solution of oxalic acid to remove them from the denitrification catalyst.

The oxalic acid concentration of the aqueous solution of oxalic acid is preferably 0.5 to 25% by weight (further preferably, 4 to 20% by weight). If the oxalic acid concentration is less than 0.5% by weight, the vanadium component ($V_2O_5$), etc. cannot be thoroughly cleaned off. If the concentration exceeds 25% by weight, the cost concerned with the treatment becomes high.

The temperature of the aqueous solution of oxalic acid is preferably 20 to 80° C. If the temperature is lower than 20° C., the vanadium component ($V_2O_5$), etc. cannot be thoroughly cleaned off. If the temperature is higher than 80° C., the cost concerned with the treatment becomes high.

The finish water washing step as the post-treatment step is the step of washing off, with water, the oxalic acid which has been deposited and has remained on the surface of the denitrification catalyst in accordance with the cleaning with the aqueous solution of oxalic acid.

The temperature of water at this time is preferably 10 to 80° C. If the temperature is lower than 10° C., the deposited residues cannot be fully dissolved until their removal. If the temperature is higher than 80° C., there will be a waste of thermal energy.

If the amount of dust deposited and accumulated in the denitrification catalyst is large, it is preferred to carry out heat-treatment in the pretreatment step, then perform the rough water washing step of washing the denitrification catalyst with water, and then perform the oxalic acid cleaning step for the denitrification catalyst.

The rough water washing step is the step of physically peeling off, although partly, the vanadium component ($V_2O_5$) weakened in adhesion in accordance with the change of state by heat-treatment, and also dissolving water-soluble compounds of alkali metals (Na, K, etc.) and alkaline earth metals (Ca, Mg, etc.) in water beforehand. This step can lessen a burden on cleaning with oxalic acid in the subsequent essential treatment step.

According to the aforementioned present invention, which performs the heat-treatment step, the rough water washing step (as desired), the oxalic acid cleaning step, and the finish water washing step, $VOSO_4$, which is the cause of the clogging of the flow holes for the exhaust gas, the decline in denitrification performance, and the enhancement of the $SO_2$ oxidizing property, can be easily removed from the denitrification catalyst used during decomposition and removal of nitrogen oxides contained in the exhaust gas from the boiler or the like where an ultraheavy oil with a sulfur content of 1% or more, such as ORIMULSION, asphalt or VOR, has been burned as a fuel.

{Inorganic Acid Cleaning Mode}

Alternatively, according to the present invention, a used denitrification catalyst is roughly washed with water, then the denitrification catalyst is cleaned with an aqueous solution of sulfuric acid or an aqueous solution of hydrochloric acid, and then the denitrification catalyst is finish washed with water to regenerate the denitrification catalyst.

Concretely, the following steps are effected: (1) The denitrification catalyst is roughly washed with water to dissolve in water, and remove, water-soluble dust components which are deposited in an end face portion of the denitrification catalyst to cause an increase in a pressure loss, and which are accumulated within the exhaust gas flow holes of the denitrification catalyst to cause a decline in denitrification performance (rough water washing step (pretreatment)). (2) Then, the denitrification catalyst is cleaned with an aqueous solution of sulfuric acid or an aqueous solution of hydrochloric acid. As a result, a vanadium component ($VOSO_4$) deposited on the surface of the denitrification catalyst, and the vanadium component ($VOSO_4$) accumulated within the exhaust gas flow holes of the denitrification catalyst, which cause a decline in the performance of the denitrification catalyst or cause enhancement of the $SO_2$ oxidizing property, are dissolved in the aqueous inorganic acid solution, and removed (inorganic acid cleaning step (essential treatment)). (3) Then, the denitrification catalyst is finish washed with water to remove residues of the inorganic acid which cause a decrease in catalyst strength (finish water washing step (post-treatment)). Finally, the denitrification catalyst is dried, whereby the denitrification catalyst can be regenerated efficiently. Details will follow.

The rough water washing step as the pretreatment step is the step of washing the denitrification catalyst with water, thereby dissolving and removing water-soluble components which are deposited on an upstream end face portion of the denitrification catalyst in its exhaust gas flow direction, and on its surface of a portion in contact with the exhaust gas, and which are accumulated within the exhaust gas flow holes of the denitrification catalyst.

The inorganic acid cleaning step as the essential step is a step in which the denitrification catalyst is cleaned with an aqueous solution of sulfuric acid or an aqueous solution of hydrochloric acid, whereby the vanadium component ($VOSO_4$), deposited on the surface of the denitrification catalyst or accumulated within the exhaust gas flow holes of the denitrification catalyst, is dissolved in the aqueous inorganic acid solution and removed.

The concentration of the aqueous solution of sulfuric acid or the aqueous solution of hydrochloric acid is preferably 3 to 12N (further preferably, 6 to 9N). If the concentration is less than 3N, VOSO$_4$ cannot be thoroughly cleaned off. If the concentration exceeds 12N, the cost concerned with the treatment becomes high.

The temperature of the aqueous solution of sulfuric acid or the aqueous solution of hydrochloric acid is preferably 60 to 90° C. (further preferably, 60 to 80° C.). If the temperature is lower than 60° C., VOSO$_4$ cannot be thoroughly cleaned off. If the temperature is higher than 90° C., the cost concerned with the treatment becomes high.

The finish water washing step as the post-treatment step is the step of washing off, with water, the inorganic acid which has been deposited and has remained on the surface of the denitrification catalyst in accordance with the cleaning with the aqueous solution of inorganic acid.

The temperature of water at this time is preferably 10 to 80° C. If the temperature is lower than 10° C., the deposited residues cannot be fully dissolved in water until their removal. If the temperature is higher than 80° C., there will be a waste of thermal energy.

The aforementioned rough water washing step is omissible. However, if the rough water washing step is omitted, various components deposited and accumulated in the denitrification catalyst dissolve in large amounts in the aqueous inorganic acid solution in the subsequent inorganic acid cleaning step, with the result that the solvency of the aqueous inorganic acid solution for the vanadium component (VOSO$_4$), the essential object of the inorganic acid cleaning step, is decreased. Thus, the rough water washing step should preferably be performed.

According to the above-mentioned present invention, which performs the rough water washing step (omissible), the inorganic acid cleaning step, and the finish water washing step, VOSO$_4$, which is the cause of the clogging of the flow holes for the exhaust gas, the decline in denitrification performance, and the enhancement of the SO$_2$ oxidizing property, can be easily removed from the denitrification catalyst used during decomposition and removal of nitrogen oxides in the exhaust gas from the boiler or the like where an ultraheavy oil with a sulfur content of 1% or more, such as ORIMULSION, asphalt or VOR, has been burned as a fuel.

{Denitrification Catalyst}

The denitrification catalyst, to which the regeneration method of the present invention can be applied, is not restricted. Its examples include various catalysts, such as those having vanadium and tungsten components carried on titania as a carrier, those having only a tungsten component carried on a titania carrier, those having vanadium and molybdenum components carried on a titania carrier, and those having other active components carried on a titania carrier.

However, the regeneration method according to the present invention can remarkably show the aforementioned effects, if this method is applied to a titanium-tungsten based denitrification catalyst prepared by forming a compound oxide from titanium and tungsten, and carrying a vanadium-based compound on the compound oxide as a carrier, rather than applied to a titanium-tungsten based denitrification catalyst prepared by forming a titania catalyst beforehand, and carrying a tungsten component on the titania catalyst.

The above-mentioned compound oxide type denitrification catalyst can be prepared, for example, by calcining a solated metatitanic acid containing at least one compound selected from among tungsten compounds, adding proper amounts of an adjuvant and water to the resulting calcination product, or the calcination product mixed with a vanadium oxide, kneading the mixture, extruding the kneaded mixture into a lattice form by an extruder, and then drying and calcining the extrudate (see, for example, Japanese Patent Publication No. 1989-14808).

More concretely, the denitrification catalyst suitable for the present invention can be prepared, for example, by adding a predetermined amount of an aqueous solution of ammonium paratungstate to metatitanic acid, dehydrating, molding and drying the mixture, and then calcining the resulting material; or by adding a predetermined amount of an aqueous solution of ammonium paratungstate to metatitanic acid, dehydrating, and drying the mixture, then impregnating the resulting material with an aqueous solution of ammonium metavanadate, molding the impregnated material, then drying and calcining the molding product.

EXAMPLE

An Example of the denitrification catalyst regeneration method according to the present invention will be described in detail, but the denitrification catalyst regeneration method of the present invention is in no way limited to the Example.

{Denitrification Catalyst}

A predetermined amount of an aqueous solution of ammonium paratungstate was added to metatitanic acid, and the mixture was calcined. An aqueous solution of ammonium metavanadate was added to the calcination product, and proper amounts of a molding adjuvant and water were added, followed by kneading the mixture. The kneading product was extruded into a lattice form (width 150 mm, height 150 mm, length 885 mm, pitch size 7 mm) by an extruder. The extrudate was dried (120° C.) and calcined (550° C.) to obtain a honeycomb-shaped denitrification catalyst (composition: 75 wt. % titanium oxide, 10 wt. % tungsten oxide, 0.5 wt. % vanadium pentoxide, and 14.5 wt. % remainder).

{Used Denitrification Catalyst}

The above denitrification catalyst was charged into a denitrification apparatus installed in an exhaust gas passage of a boiler using ORIMULSION (sulfur content: 2.5%) as a fuel, and was used for 26,000 hours (temperature 395° C., NH$_3$/NO$_x$=0.8 (mol ratio)). Then, a part of the denitrification catalyst was sampled to obtain the denitrification catalyst after treatment of an Orimulsion-fired boiler exhaust gas.

{Comparison Between the Denitrification Catalyst Before Use and that After Use}

The denitrification catalyst before use and that after use were examined for changes in denitrification performance (denitrification rate), SO$_2$ oxidizing property (SO$_2$ oxidation rate), and vanadium pentoxide content. The results are shown in Table 2 below.

The denitrification rate and the SO$_2$ oxidation rate were determined as follows: The denitrification catalyst was divided into two portions (each portion: width 45.55 mm (6 holes), height 52.95 mm (7 holes), length 885 mm). The two portions of the denitrification catalyst were charged into an activity test device, and a combustion exhaust gas generated in a combustion furnace was introduced into the test device (23.3 m$^3$N/h). After aging for 20 hours (gas temperature 395° C., NH$_3$/NO$_x$=1.0 (mol ratio)), the NO$_x$ concentration, the SO$_2$ concentration, and the SO$_3$ concentration at the inlet and outlet of the test device were measured. The results were substituted into Equations (2) and (3) indicated below to calculate the denitrification rate and the SO$_2$ oxidation rate.

The inlet gas composition was O$_2$: 2%, NO$_x$: 200 ppm, SO$_2$: 2500 ppm, SO$_3$: 10 ppm, the remainder being N$_2$ and CO$_2$. The area velocity value (AV value, the value obtained by dividing the amount of the gas for treatment by the gas contact area of the catalyst) was 12.5 m³ N/m² h.

$$\text{Denitrification rate (\%) } 32 \text{ (inlet NO}_x\text{-outlet NO}_x)/\text{inlet NO}_x \times 100 \quad (2)$$

$$\text{SO}_2 \text{ oxidation rate (\%) } = (\text{outlet SO}_3\text{-inlet SO}_3)/\text{inlet SO}_2 \times 100 \quad (3)$$

TABLE 2

| Test item | Denitrification catalyst before use | Denitrification catalyst after use |
|---|---|---|
| Denitrification rate (%) | 95.8 | 93.4 |
| SO₂ oxidation rate (%) | 0.3 | 2.8 |
| Amount of V₂O₅ in catalyst (wt. %) | 0.29 | 5.60 |

Table 2 confirmed that the denitrification catalyst after use decreased in the denitrification rate, increased in the $SO_2$ oxidation rate, and increased in the vanadium content, as compared with the denitrification catalyst before use.

{A. Regeneration of the Used Denitrification Catalyst by the Heat-Treatment Mode}

<Specimen 1>

The used denitrification catalyst was heat-treated (500° C.×5 h) in an electric furnace, and then the denitrification catalyst was immersed in an aqueous solution of oxalic acid (oxalic acid concentration: 4%, temperature: 60° C.) (proportion of the solution to the denitrification catalyst: 3.0, immersion time: 2 h). Then, the denitrification catalyst was withdrawn from the aqueous solution of oxalic acid, and immersed in water (temperature: 25° C.) (proportion of the water to the denitrification catalyst: 3.0, immersion time: 30 min). Then, the denitrification catalyst was withdrawn from within water, washed with water, and dried to obtain Specimen 1.

<Specimen 2>

Specimen 2 was obtained by the same procedure performed under the same conditions as for Specimen 1, except that the oxalic acid concentration of the aqueous solution of oxalic acid was 20%.

<Specimen 3>

Specimen 3 was obtained by the same procedure performed under the same conditions as for Specimen 1, except that the oxalic acid concentration of the aqueous solution of oxalic acid was 25%.

<Specimen 4>

Specimen 4 was obtained by the same procedure performed under the same conditions as for Specimen 1, except that the heat-treated denitrification catalyst was immersed in water (temperature: 25° C.) (proportion of the water to the denitrification catalyst: 3.0, immersion time: 30 min) for rough washing with water.

<Specimen 5>

Specimen 5 was obtained by the same procedure performed under the same conditions as for Specimen 4, except that the oxalic acid concentration of the aqueous solution of oxalic acid was 0.5%.

<Control 1>

Control 1 was obtained by the same procedure performed under the same conditions as for Specimen 1, except that the heat-treatment was omitted.

<Control 2>

Control 2 was obtained by the same procedure performed under the same conditions as for Specimen 2, except that the heat-treatment was omitted.

<Control 3>

Control 3 was obtained by the same procedure performed under the same conditions as for Specimen 1, except that the oxalic acid concentration of the aqueous solution of oxalic acid was 0.1%.

<Control 4>

Control 4 was obtained by the same procedure performed under the same conditions as for Specimen 1, except that the oxalic acid concentration of the aqueous solution of oxalic acid was 0.5%.

<Control 5>

Control 5 was obtained by the same procedure performed under the same conditions as for Specimen 4, except that the oxalic acid concentration of the aqueous solution of oxalic acid was 0.1%.

{Evaluation Experiments}

An exhaust gas was passed through each of the above-mentioned Specimens 1 to 5 and Controls 1 to 5 under the conditions shown in Table 3 below, and each of these regenerated denitrification catalysts was measured for denitrification performance and $SO_2$ oxidation rate. Then, each of the Specimens 1 to 5 and Controls 1 to 5 was cut out, and each of the regenerated denitrification catalysts was observed for the status of dust deposition and analyzed for the concentration of $V_2O_5$. The results are shown in Table 4. The data on the denitrification catalyst before use and that after use shown in Table 2 are also tabulated.

TABLE 3

| Amount of gas | | 23.30 m³ N/h |
|---|---|---|
| Ugs | | 2.74 m N/sec |
| AV | | 12.5 m³ N/m² · h |
| Gas temperature | | 395° C. |
| Properties of gas | NO_x | 150 ppm |
| | NH₃ | 150 ppm |
| | SO_x | 2500 ppm |
| | O₂ | 2.0 |
| | CO₂ | ca. 14% |
| | H₂O | ca. 13% |
| | N₂ | balance |

TABLE 4

| Denitrification catalyst | | Denitrification rate (%) | SO₃ oxidation rate (%) | V₂O₅ (wt %) | Dust deposition |
|---|---|---|---|---|---|
| Before use | | 95.8 | 0.3 | 0.29 | No |
| After use | | 93.4 | 2.8 | 5.60 | Yes (thickness 60-80 μm) |
| Specimen | 1 | 96.5 | 0.3 | 0.30 | No |
| | 2 | 96.5 | 0.3 | 0.30 | No |
| | 3 | 96.0 | 0.3 | 0.28 | No |
| | 4 | 96.5 | 0.4 | 0.4 | No |
| | 5 | 96.5 | 0.3 | 0.3 | No |
| Control | 1 | 94.6 | 1.0 | 4.60 | Yes (thickness 60-80 μm) |
| | 2 | 94.8 | 0.9 | 4.50 | Yes (thickness 60-80 μm) |
| | 3 | — | — | | Yes |
| | 4 | — | — | | Yes |
| | 5 | — | — | | Yes |

Table 4 confirmed that Specimens 1 to 5 markedly recovered denitrification performance and low property of oxidizing $SO_2$, and were able to remove most of dust deposited on the surface, the cause of clogging, in comparison with Control 1 and 2.

It was also confirmed that Specimens 1 to 3 were able to clean off the dust (vanadium component) nearly completely, and were able to restore denitrification performance and low property of oxidizing $SO_2$ to the same levels as those of the denitrification catalyst before use, in comparison with Controls 3 and 4.

It was further confirmed that Controls 4 and 5 failed to clean off the vanadium component thoroughly, while Specimen 5 was successful in cleaning off the vanadium component thoroughly. This finding confirmed that washing with water after calcination was able to decrease the oxalic acid concentration during cleaning with oxalic acid, thus improving cost reduction.

As stated earlier, the denitrification catalyst declines in denitrification performance and increases in $SO_2$ oxidizing property, as a result of deposition of mainly blue $VOSO_4$ on its surface and the accumulation of the vanadium component and alkali components such as sodium. In regenerating this denitrification catalyst, the denitrification catalyst is heat-treated to convert the deposited and accumulated vanadium component into $V_2O_5$, and then cleaning with oxalic acid is performed, whereby $V_2O_5$ can be fully cleaned off.

Furthermore, washing with water subsequent to heat-treatment can partially remove, before oxalic acid cleaning, the vanadium compounds which have become easily strippable because of their change in state. Thus, the oxalic acid concentration during cleaning with oxalic acid can be decreased, thereby achieving cost reduction.

{B. Regeneration of the Used Denitrification Catalyst by the Inorganic Acid Cleaning Mode}

<Specimens 1 to 16>

The used denitrification catalyst was immersed in water (proportion of the water to the denitrification catalyst: 3.0 (volume ratio), immersion time: 60 min) for rough washing with water. Then, the denitrification catalyst was immersed in an aqueous solution of an inorganic acid each of the types, concentrations and temperatures shown in Table 5 below (proportion of the solution to the denitrification catalyst: 6.0 (volume ratio), immersion time: 8 h), with air bubbling being carried out. Then, the denitrification catalyst was withdrawn from the aqueous solution, and immersed in water (proportion of the water to the denitrification catalyst: 3.0, immersion time: 60 min) for finish washing with water. Then, the denitrification catalyst was withdrawn from within water, and dried to obtain Specimens 1 to 16.

<Control 1>

Control 1 was obtained by the same procedure performed under the same conditions as for Specimens 1 to 16, except that mere water (temperature 60° C.) was used in place of the aqueous solution of inorganic acid.

<Control 2>

Control 2 was obtained by the same procedure performed under the same conditions as for Specimens 1 to 16, except that an aqueous solution of oxalic acid (concentration 4% (0.9N), temperature 60° C.) was used in place of the aqueous solution of inorganic acid.

<Controls 3 to 6>

Controls 3 to 6 were obtained by the same procedure performed under the same conditions as for Specimens 1 to 16, except that the types, concentrations and temperatures of the aqueous solution of inorganic acid were those shown in Table 5.

TABLE 5

| Denitrification catalyst | | Acid | Acid concentration (N: normal) | Temperature (° C.) |
|---|---|---|---|---|
| Specimen | 1 | Sulfuric acid | 3 | 60 |
| | 2 | Sulfuric acid | 6 | 60 |
| | 3 | Sulfuric acid | 9 | 60 |
| | 4 | Sulfuric acid | 12 | 60 |
| | 5 | Sulfuric acid | 3 | 80 |
| | 6 | Sulfuric acid | 6 | 80 |
| | 7 | Sulfuric acid | 9 | 80 |
| | 8 | Sulfuric acid | 12 | 80 |
| | 9 | Hydrochloric acid | 3 | 60 |
| | 10 | Hydrochloric acid | 6 | 60 |
| | 11 | Hydrochloric acid | 9 | 60 |
| | 12 | Hydrochloric acid | 12 | 60 |
| | 13 | Hydrochloric acid | 3 | 80 |
| | 14 | Hydrochloric acid | 6 | 80 |
| | 15 | Hydrochloric acid | 9 | 80 |
| | 16 | Hydrochloric acid | 12 | 80 |
| Control | 1 | None (water) | — | 60 |
| | 2 | Oxalic acid | 0.9 | 60 |
| | 3 | Sulfuric acid | 1 | 80 |
| | 4 | Hydrochloric acid | 1 | 80 |
| | 5 | Sulfuric acid | 12 | 40 |
| | 6 | Hydrochloric acid | 12 | 40 |

{Evaluation Experiments}

Each of the Specimens 1 to 16 and Controls 1 to 6 was observed for the status of dust deposition. Also, an exhaust gas was passed through each of the above-mentioned Controls 1 and 2 and the above-mentioned Specimens, completely relieved of the dust, in the same manner as in the aforementioned experiments A (see Table 3). Then, each of these regenerated denitrification catalysts was measured for denitrification performance and $SO_2$ oxidation rate. The results are shown in Table 6.

TABLE 6

| Denitrification catalyst | | Dust deposition status | Denitrification rate (%) | $SO_2$ oxidation rate (%) |
|---|---|---|---|---|
| Specimen | 1 | Δ | — | — |
| | 2 | ○ | 96.5 | 0.7 |
| | 3 | ○ | 96.5 | 0.7 |
| | 4 | ○ | 96.0 | 0.6 |
| | 5 | ○ | 97.0 | 0.8 |
| | 6 | ○ | 96.5 | 0.7 |
| | 7 | ○ | 96.0 | 0.6 |
| | 8 | ○ | 96.0 | 0.6 |
| | 9 | Δ | — | — |
| | 10 | ○ | 96.5 | 0.7 |
| | 11 | ○ | 96.5 | 0.7 |
| | 12 | ○ | 96.5 | 0.7 |
| | 13 | ○ | 97.0 | 0.8 |
| | 14 | ○ | 96.5 | 0.7 |
| | 15 | ○ | 96.0 | 0.6 |
| | 16 | ○ | 96.0 | 0.6 |
| Control | 1 | X | 93.9 | 2.3 |
| | 2 | X | 94.6 | 1.0 |
| | 3 | X | — | — |
| | 4 | X | — | — |
| | 5 | X | — | — |
| | 6 | X | — | — |

○: Completely removed.
Δ: Remained thinly.
X: Remained.

Table 6 shows that in Controls 1 to 6, the dust minimally dissolved, and the amount of the remaining dust was large, whereas in Specimens 1 to 16, dust nearly dissolved, and there was little dust remaining, and particularly in Specimens 2 to 8 and 10 to 16, the dust completely dissolved, and there was no dust remaining.

In Specimens 2 to 8 and 10 to 16 completely freed of dust, the denitrification rate was 96.0 to 97.0%, and the $SO_2$ oxidation rate was 0.6 to 0.8%. Thus, it was confirmed that the denitrification rate and the $SO_2$ oxidation rate were both improved.

As stated earlier, the denitrification catalyst declines in denitrification performance and increases in $SO_2$ oxidizing property, as a result of deposition of mainly blue $VOSO_4$ on its surface and the accumulation of the vanadium component and alkali components such as sodium. In regenerating this denitrification catalyst, the denitrification catalyst is cleaned with an aqueous solution of sulfuric acid or hydrochloric acid, whereby deposited and accumulated vanadium compounds can be fully cleaned off. Particularly when the acid concentration is 3 to 9N and the temperature is 60 to 80° C., deposited and accumulated vanadium compounds can be fully cleaned off.

As discussed above, the present invention efficiently removes dust deposited and accumulated on the wall surface of a titania-based honeycomb-shaped denitrification catalyst applied to an exhaust gas from a boiler or the like, which burns an ultraheavy oil with a sulfur content of 1% or more, such as ORIMULSION, asphalt or VOR, as a fuel, thereby making it possible to regenerate, with ease, the denitrification catalyst declining in denitrification performance and enhanced in $SO_2$ oxidizing property. The present invention can treat the denitrification catalyst at a lower cost than the cost involved in newly producing a denitrification catalyst and using it, and can recycle the treated denitrification catalyst. Thus, the present invention contributes to the effective use of resources.

While the present invention has been described by the above-described embodiments, it is to be understood that the invention is not limited thereto, but may be varied in many other ways. Such variations are not to be regarded as a departure from the spirit and scope of the invention, and all such modifications as would be obvious to one skilled in the art are intended to be included within the scope of the appended claims.

What is claimed is:

1. A denitrification-catalyst regeneration method, comprising:
    denitrifying exhaust gas produced by the combustion of ultraheavy oil with a sulfur content of 1% or higher using a denitrification catalyst, wherein said denitrification step results in the deposit on the surface of the denitrification catalyst of vanadium oxysulfate;
    then cleaning the resulting used denitrification catalyst having vanadium oxysulfate on its surface with an aqueous solution of sulfuric acid or an aqueous solution of hydrochloric acid, thereby producing a denitrification catalyst from which vanadium oxysulfate has been removed; and
    then finish-washing said denitrification catalyst with water to regenerate said denitrification catalyst.

2. The denitrification catalyst regeneration method according to claim 1, further comprising:
    roughly washing said denitrification catalyst with water; and
    then performing said cleaning of said denitrification catalyst with said aqueous solution of sulfuric acid or said aqueous solution of hydrochloric acid.

3. The denitrification catalyst regeneration method according to claim 1, wherein an acid concentration of said aqueous solution of sulfuric acid or said aqueous solution of hydrochloric acid is 3 to 12 N.

4. The denitrification catalyst regeneration method according to claim 3, wherein a temperature of said aqueous solution of sulfuric acid or said aqueous solution of hydrochloric acid is 60 to 90° C.

* * * * *